UNITED STATES PATENT OFFICE.

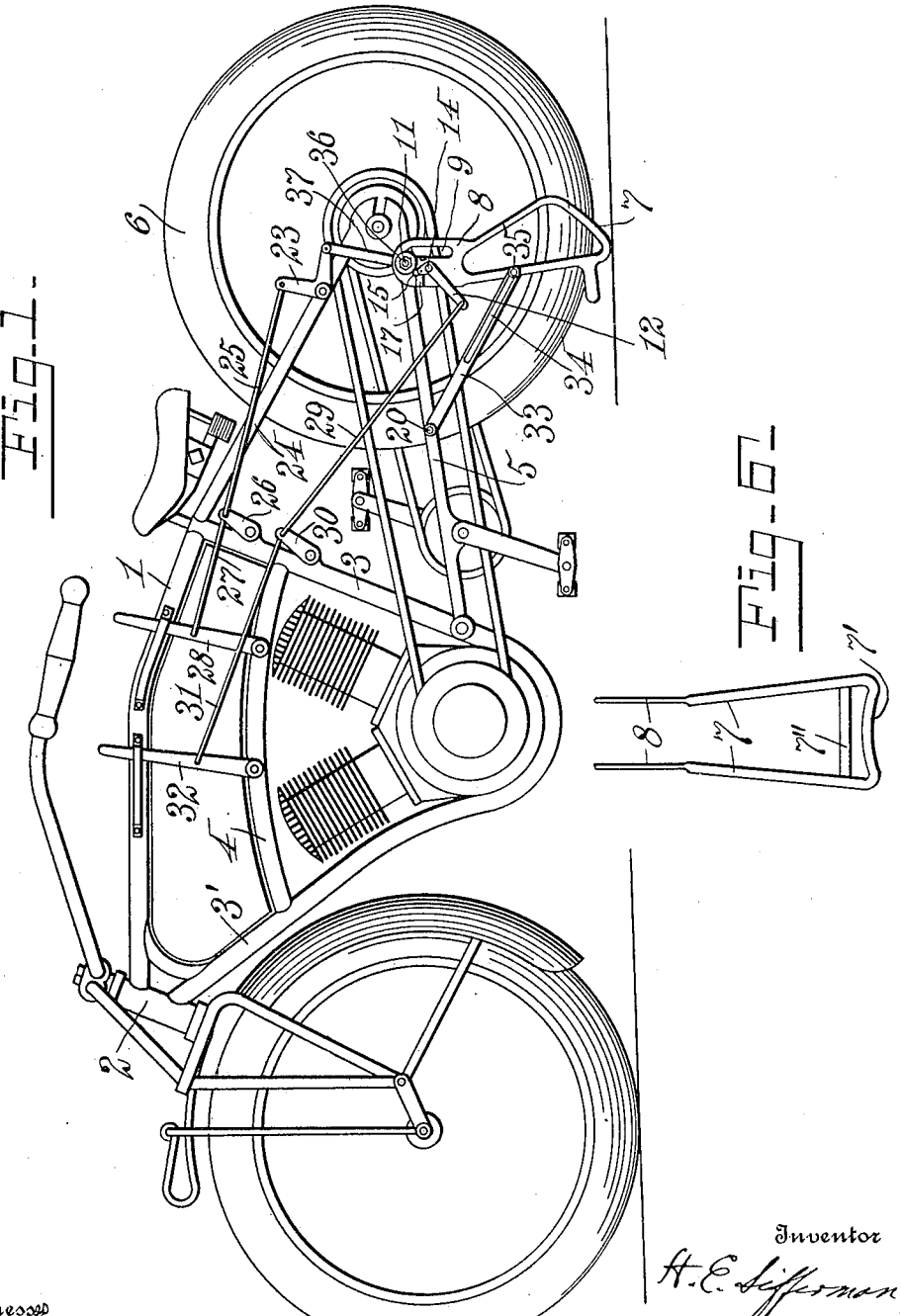

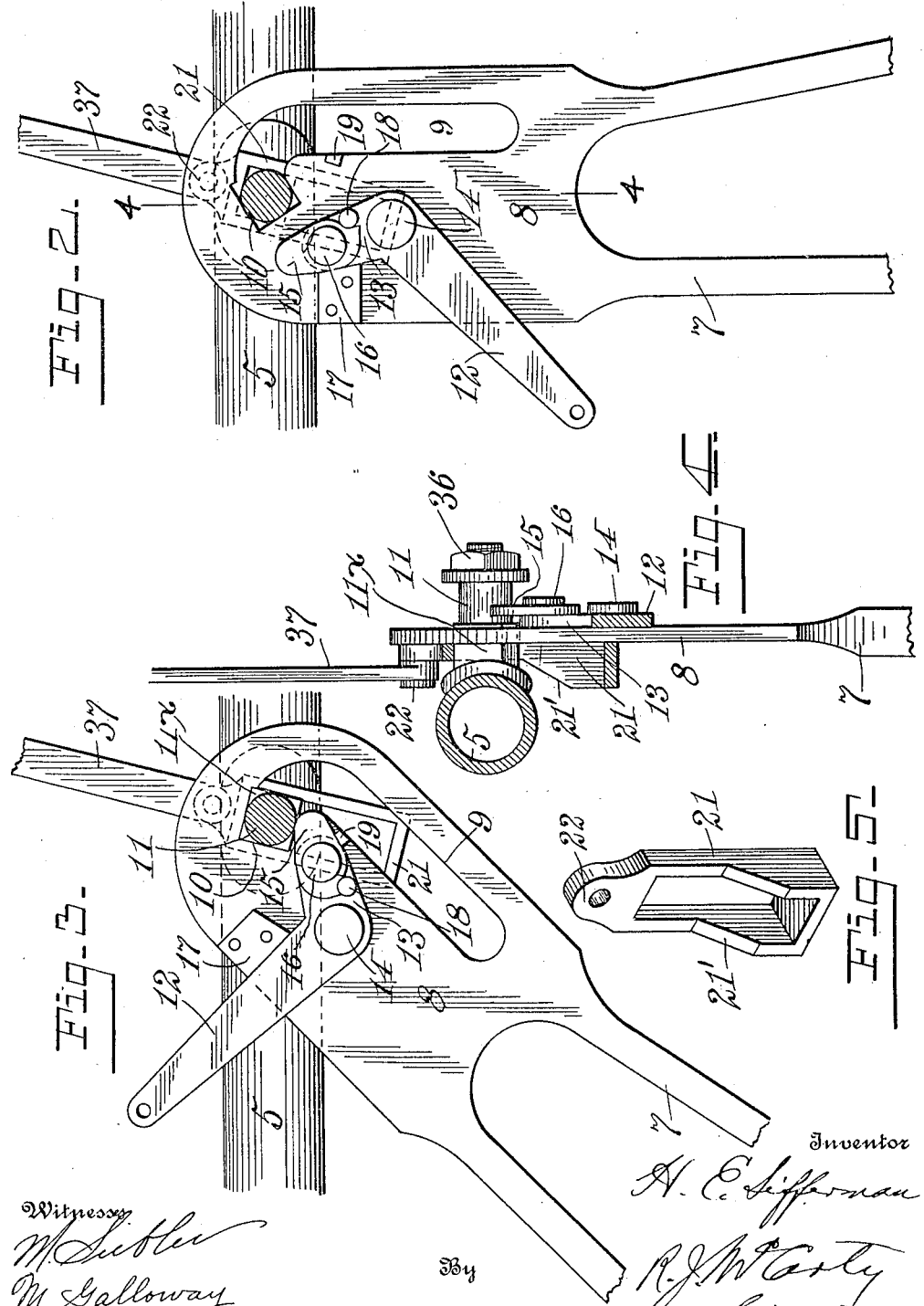

HARVEY E. SIFFERMAN, OF DAYTON, OHIO.

MOTOR-CYCLE SUPPORT.

1,207,088.  Specification of Letters Patent.  Patented Dec. 5, 1916.

Application filed February 29, 1916. Serial No. 81,124.

*To all whom it may concern:*

Be it known that I, HARVEY E. SIFFERMAN, a citizen of the United States, residing at Dayton, in the county of Montgomery and State of Ohio, have invented certain new and useful Improvements in Motor-Cycle Supports; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in stands for motorcycles and has for its object the provision of an improved stand which is operated in connection with the rear wheel of the motorcycle to support the latter in an upright position when still.

It has the novel and useful features hereinafter described and claimed.

One of the principal objects of the invention is to provide a device of the above character which is easily manipulated and is devoid of spring connections and is conveniently operated from the seat of the driver through certain connections which are positive and reliable in their operation.

Preceding a detail description of the invention, reference is made to the accompanying drawings of which—

Figure 1 is a side elevation of a motorcycle equipped with my improved stand or rest which is shown in the serviceable position; Figs. 2 and 3 are enlarged elevations of the cam and coöperating devices by means of which the stand is manipulated into and out of the supporting position shown in Fig. 1; Fig. 4 is a sectional view approximately on the line 4—4 of Fig. 2. In this view the square portion 11$^x$ of the trunnion lies within the square portion 10 of the slot 9. In Fig. 2, it will be understood, the relative positions of the parts 11$^x$ and 10 are different from those shown in Fig. 4. Fig. 5 is a detail perspective view of one of the elements through which the device is locked in the supporting position; and Fig. 6 is a detail rear elevation of the stand detached from other parts.

In a detail description of the invention, similar reference characters indicate corresponding parts.

In the drawings, Fig. 1, I have illustrated a conventional form of motorcycle but here it may be stated that my improvements may be applied to any form of motorcycle frame that may vary in structure from that illustrated. It is commonly understood, however, that the usual form of motorcycle frames consists of upper and lower tubular frame members 1 and 4. The former of which, to-wit, 1, extends from the saddle post 3 to the steering head 2 and the latter of which, to-wit, 4, extends from the saddle post proper to the forward extension 3' thereof which joins the steering head. Upper and lower rearward frame members or forks 5 and 24 extend on each side of the rear wheel 6 from the saddle post 3 to the axle of said rear wheel. The cycle support consists of two plate members 8 which terminate in stand members 7 joined at the lower ends by a cross ground portion 7' and a cross brace 7'' both of which lie below the periphery of the wheel 6 when the stand is lowered to the position shown in Fig. 1. The plate members 8 of the said stand have each a vertical slot 9 the upper portions of which curve toward the center of said plates and terminate in square openings 10, as shown more clearly in Fig. 2. A trunnion 11 is brazed to each side of the lower fork 5 of the cycle frame. These trunnions 11 penetrate the slots 9 and have on their outer ends suitable nuts 36 to maintain them in said slots. The inner portion 11$^x$ of each of said trunnions 11 is square. When the said square portions of said trunnions engage the square openings 10 at the upper ends of the slots 9 the plate members 8 are held in the position as shown in Fig. 3 in which the cycle is not supported by the stand. When the round portions of said trunnions 11 lie within the square openings of the slots 9, the plates 8 and the stand may be moved to positions to bring the trunnions 11 rearward from the position shown in Fig. 2 to the entrance of the slots 9 to permit the wheel to drop to the ground. At such time the stand is moved forwardly from beneath the wheel. An angular lever 12 is pivoted at 14 to each of the side plates 8 and each of these levers is provided with a portion 13 which lies above the pivot 14. On these portions of said levers 12 a nose 15 is pivoted at 16. Each of said noses or lever extensions 15 is in a position to engage its respective trunnion 11 when said levers 12 are moved simultaneously in the direction to engage the trunnions 11 to move the plates 8 to a position to permit said trunnions to enter the curved or straight portions of the slots. As shown in Fig. 2, the projection 15 of the lever 12 is in a position to engage the trunnions 11. Pressure against the trunnions 11 will cause them to move out of the square parts 10 and into the upper portions of the slots 9 and thus permit the wheel 6 to drop to the ground.

When the lever extensions or noses 15 of the levers 12 are performing the function of disengaging the trunnions 11 from the square portions of the slots 9, the said lever extensions 15 are held by studs 18 mounted on said levers 12. When the levers 12 move by gravity in the opposite direction the lever extensions 15 yield and permit said levers 12 to move from the position shown in Fig. 3 to the position shown in Fig. 2. The movement of the supporting stand from the non-supporting position to the position shown in Fig. 1 is accomplished by pushing the lever 28 forward when the stand is in a non-supporting position. This operation has the effect of pushing the side plates 8 of the stand from the square portions of the trunnions 11 thus allowing the stand to strike the ground. The rear wheel of the machine is then elevated by pushing the machine slightly forward. It will be understood that when the cycle is being supported with the rear wheel elevated, the square portions $11^x$ of the trunnions 11 are out of the square portions 10 of the slots 9. Before the plates 8 can be moved to the position to permit said trunnions to pass out of the square portions 10 of said slots the said square portions 10 must be moved away laterally from the square portions $11^x$ of the trunnions. This is accomplished by means of two cam members 21 one of which lies on the inner side of each of the plates 8 and is connected by a pivot 22 to levers 37. The trunnions 11 penetrate the cam members 21 before entering the slots 9 of the plates 8. Each of said cam members 21 has inclined surfaces 21' which engage the adjacent sides of the fork members 5 when the said cam members are elevated by operating the levers 37 in a manner presently described. This operation of elevating the cam members 21 causes the plates 8 to spring outwardly and to bring the square portions 10 of the slots 9 away from the square portions $11^x$ of the trunnions 11, the plates 8 including the entire stand members 7, it will be borne in mind, have resiliency. The device is then in a position wherein the plates 8 may be moved through the engagement of the lever extensions 15 with the trunnions 11 to move said trunnions 11 into the upper portion of the slots 9 and to thereby permit the wheel 6 and the rear part of the frame of the motorcycle to drop to the ground. The levers 37 are connected to the lower arms of bell-crank levers 23, one of said bell-crank levers being fulcrumed on the upper rear fork 24 of the motor-cycle frame on each side of the rear wheel 6. The upper arms of said bell-crank levers 23 are connected to rods 25 which in turn are connected to cranks 26 fulcrumed on the saddle post 3. The crank members 26 are connected to an operating lever 28 by rods 27, said operating lever 28 being fulcrumed on the lower frame member 4 and operated from the driver's seat. When operated, the cam members 21 are elevated to spring outwardly the plates 8 from the position shown in Fig. 4 to the round portions of the trunnions 11. This is the initial operation. The subsequent operation to permit the wheel to rest upon the ground is accomplished through the levers 12 which are in turn connected to rods 29 and cranks 30, the cranks 30 being fulcrumed on the seat post 3. Rods 31 extend from the cranks 30 and connect with an operating lever 32 which is fulcrumed on the lower frame member 4 in advance of the lever 28 and within convenient reach of the driver of the machine. The forward movement of the operating lever 32 elevates the levers 12 to bring the pivotal extensions 15 in engagement with the trunnions 11. The continued forward movement of the operating lever 32 causes a relative movement of the plates 8 and trunnions 11 until the trunnions 11 are in a position to enter the upper portions of the slots 9. At this time the weight of the machine will cause the rearward part thereof to drop to the ground, the trunnions 11 in this case occupying lower positions in the slots 9. The movement of the levers 12 is limited by stops 17 and 19 secured to the plates 8. As shown in Fig. 2, the levers 12 are in a position to be moved to bring the extension 15 in engagement with the trunnions 11. The continued movement of the said levers 12 will cause the plates 8 to move as shown in Fig. 3, in which position the trunnions 11 are at the entrance of the upper portions of the slots 9. The levers 12 move by gravity from their position, as shown in Fig. 3, to that shown in Fig. 2, the pivotal extensions 15 yielding in their engagement with the trunnions 11. It is necessary for the cam member 21 to be in the position shown in Fig. 3 in order to permit the side plates 8 to snap onto the square portions of the trunnions. At the stage of the operation shown in Fig. 3, the frame has been elevated by the levers 12 engaging the projections 17. When the lever 32 is released the levers 12 will fall by gravity thus placing the pivotal members 15 on the other side of the trunnions. At the stage of the operation shown in Fig. 2, the said plates 8 have been moved outwardly by the cams 21 and are being held outwardly by the square portions of the trunnions, and the cams 21 have returned to a normal position by gravity. The members 7 of the stand are prevented from moving too far rearwardly from the perpendicular position as shown in Fig. 1 by means of anti-friction pins 35 thereon engaging the ends of bars 33 which are pivoted at 20 to the lower rearward fork members 5. The bars 33 have longitudinal slots 34 which permit the stand to be elevated to the position shown in Fig. 3.

From the foregoing description, it will be apparent that the device will be held in either of its positions by manipulating the levers 28 and 32 and that the means for holding the motorcycle on its support is positive in its character owing to the character of the upper terminals of the slots 9 and the construction of the trunnions 11.

While the elements shown and described are of preferable construction and suit the purposes, it will be understood that various departures may be had therefrom without sacrificing the essential features of the invention as set forth in the sub-joined claims.

Having described my invention, I claim.

1. The combination with a motorcycle, of a stand connected to the rear frame thereof having upper plates provided with slots the upper terminals of which are rectangular, means for locking said plates in a position to maintain said stand in a non-supporting position said means coöperating with the rectangular parts of said slots, means for disconnecting said locking means from said slots, and means for moving said stand relative to said locking means whereby the weight of the motorcycle will dislodge the same from said stand.

2. The combination with a motorcycle, of a stand the upper ends of which terminate in plates provided with slots which terminate at their upper ends in rectangular openings, trunnions projecting from the motorcycle frame and penetrating said slots said trunnions having square portions which are adapted to interlock with the rectangular portions of said slots and to hold the stand in a non-supporting position, cam members adapted to effect a disengagement between the square portions of the trunnions and the rectangular portions of said slots, means for operating said cam members to change the relative position between said trunnions and the plate portions of the stand, whereby said trunnions are permitted to enter the vertical parts of said slots.

3. The combination with a motorcycle, of a stand the upper portions of which terminate in plates provided with slots which terminate in rectangular openings, trunnions mounted on the rear portion of the motorcycle frame and having cylindrical and square portions the square portions being adapted to lock the stand in a nonsupporting position by engaging with said rectangular openings, means for spreading the plate portions of said stand to move the rectangular slot portions thereof away from the rectangular portions of said trunnions, and levers fulcrumed on said plate portions of the stand and adapted to engage said trunnions when the plate portions are so spread whereby the said stand is moved and the trunnions are permitted to drop by gravity into the perpendicular portions of the slots thereby permitting the rear wheel of the motor cycle to engage the ground when the stand is elevated.

4. The combination with a motor cycle, of a stand the upper portion of which terminates in plates provided with slots terminating at their upper ends in rectangular openings, trunnions projecting from the motorcycle frame having cylindrical and square portions, cam members movable on the inner sides of said plates and through which the trunnions project before penetrating the slots in the plates, the rectangular terminals of the slots being engaged with the rectangular portions of the trunnions when the stand is in a non-supporting position, levers connected to said cam members whereby said cam members are actuated to spread the plate portions of the stand to remove the rectangular portions of the slots away from the square portions of the trunnions and to permit the cylindrical portions of said trunnions to lie within the slots of said plate portions, levers fulcrumed on said plate portions in positions to engage said trunnions and to move the stand to a position wherein the trunnions and therewith the motorcycle will drop by gravity to an engagement with the ground.

5. The combination with a motorcycle, of a stand the upper portion of which terminates in plates having vertical slots terminating at the upper end in lateral rectangular openings, trunnions extending from the frame of the motorcycle and penetrating said slots, said trunnions having their inner portions of rectangular form adapted to engage the rectangular portions of said slots to lock the stand in a non-supporting position, cam members having openings therein which receive the square portions of said trunnions, and connections with said cam members whereby they are elevated to spread said plate portions and thereby remove the rectangular openings therein away from the rectangular portions of the trunnions.

In testimony whereof I affix my signature.

HARVEY E. SIFFERMAN.

Copies of this patent may be obtained for five cents each, by addressing the "Commissioner of Patents, Washington, D. C."